US011040685B2

United States Patent
Saito et al.

(10) Patent No.: US 11,040,685 B2
(45) Date of Patent: Jun. 22, 2021

(54) OCCUPANT EYE(S) OBSERVATION DEVICE

(71) Applicant: HONDA MOTOR CO., LTD., Tokyo (JP)

(72) Inventors: Kota Saito, Wako (JP); Seungho Choi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/815,088

(22) Filed: Mar. 11, 2020

(65) Prior Publication Data

US 2020/0290544 A1  Sep. 17, 2020

(30) Foreign Application Priority Data

Mar. 14, 2019  (JP) .............................. JP2019-047756

(51) Int. Cl.
*B60R 21/015* (2006.01)
*B60W 40/08* (2012.01)
*G06K 9/00* (2006.01)

(52) U.S. Cl.
CPC ....... *B60R 21/01552* (2014.10); *B60W 40/08* (2013.01); *G06K 9/00597* (2013.01); *G06K 9/00845* (2013.01); *B60W 2040/0818* (2013.01)

(58) Field of Classification Search
CPC ............. B60R 21/01552; B60W 40/08; G06K 9/00597; G06K 9/00845
See application file for complete search history.

(56) References Cited

U.S. PATENT DOCUMENTS

| | | | | |
|---|---|---|---|---|
| 2008/0226175 A1* | 9/2008 | Suzuki | ............... | G06K 9/00268 382/190 |
| 2018/0116579 A1* | 5/2018 | Omi | ........................ | B60K 28/06 |
| 2019/0143989 A1* | 5/2019 | Oba | ........................ | A61B 3/113 701/70 |

FOREIGN PATENT DOCUMENTS

JP  5343631  11/2013

* cited by examiner

*Primary Examiner* — Hongmin Fan
(74) *Attorney, Agent, or Firm* — Amin, Turocy & Watson, LLP (57) ABSTRACT

Provided is an occupant observation device including an imager configured to capture an image of a head of an occupant of a vehicle; and an eye detector configured to detect at least a part of eyes of the occupant in the image captured by the imager, in which the eye detector sets an eye closer to the imager among the eyes of the occupant as a detection target.

5 Claims, 7 Drawing Sheets

OCCUPANT EYE(S) OBSERVATION DEVICE

CROSS-REFERENCE TO RELATED APPLICATION

Priority is claimed on Japanese Patent Application No. 2019-047756, filed Mar. 14, 2019, the content of which is incorporated herein by reference.

BACKGROUND

Field of the Invention

The present invention relates to an occupant observation device.

Description of Related Art

Research is being conducted on a mechanism which detects a condition of an occupant, including a driver of a vehicle, using a device. The condition of the occupant includes whether the occupant feels sleepy, a degree of concentration, an emotion, and the like. Important factors for detecting the condition of the occupant are conditions of the eyes. Therefore, devices that capture an image of an occupant with a camera, analyze the image, and observe the condition of the eyes have been put into practical use.

For example, Japanese Patent No. 5343631 discloses a driving supporting device which is equipped with an imager that captures an image of a driver's face; a detector that detects movement of a driver's mouth or hand and opening and closing of eyes from a face image captured by the imager; a first feature detector that detects a yawn from a change in a shape of a vertical component of the mouth detected by the detector, detects a sigh or a deep breath from a change in the shape of a horizontal component of the mouth, detects a movement motion of a driver's neck or head from a change in shape of the mouth, and detects a motion of a hand that approaches or separates from the driver's face; a second feature detector that detects an eye closing rate from a closing time of the eyes; and a determining unit that determines an arousal condition of the driver, a struggle or conflict condition with respect to drowsiness, an initial condition of dozing, and a dozing condition from temporal changes in the feature motions detected by the first feature detector and the second feature detector.

SUMMARY

However, in the related art, in some cases, it is difficult to use a process for real-time control or the like of a vehicle or the like, because a processing load when detecting the eyes in an image is high and a long time is required. In some cases, the frequency of erroneous detection also increases.

The present invention has been made in view of such circumstances, and an object thereof is to provide an occupant observation device capable of reducing the processing load and improving the detection accuracy.

The occupant observation device according to the present invention adopts the following configuration.

(1): An occupant observation device according to an aspect of the present invention includes an imager configured to capture an image of a head of an occupant of a vehicle; and an eye detector configured to detect at least a part of eyes of the occupant in the image captured by the imager, in which the eye detector sets an eye closer to the imager among the eyes of the occupant as a detection target.

(2): In the aforementioned aspect (1), the imager may be attached at a position which is offset in a horizontal direction from a position directly facing a seating position of the occupant in the vehicle.

(3): In the aforementioned aspect (1), the eye detector may detect at least a part of contours of the eyes of the occupant, and the occupant observation device may further include an eye opening rate deriving unit configured to derive an eye opening rate of the eyes of the occupant, on the basis of a positional relationship of a plurality of feature points in the contours detected by the eye detector.

(4): In the aforementioned aspect (3), the plurality of feature points may include an end portion, an upper end portion, and a lower end portion of the contours on a side closer to the imager in the horizontal direction.

(5): In the aforementioned aspect (1), the eye detector may switch the detection target to an eye farther from the imager between the eyes of the occupant, on the basis of a degree of detection of the eye closer to the imager among the eyes of the occupant.

According to the aforementioned aspects (1) to (5), the processing load can be reduced and the detection accuracy can be improved.

According to the aforementioned aspect (3), the processing load can be further reduced.

According to the aforementioned aspect (4) or (5), the continuity of the process can be further improved.

DESCRIPTION OF EMBODIMENTS

DETAILED DESCRIPTION OF THE INVENTION

Hereinafter, an embodiment of an occupant observation device of the present invention will be described with reference to the drawings. The occupant observation device is mounted on a vehicle. The vehicle is a four-wheeled vehicle, a two-wheeled vehicle, or the like. In the following description, it is assumed that the vehicle is a four-wheel vehicle. Although the vehicle is assumed to be a right-hand drive vehicle, when applied to a left-hand drive vehicle, a left-right relationship in the following description may be read in reverse.

Figure 1:
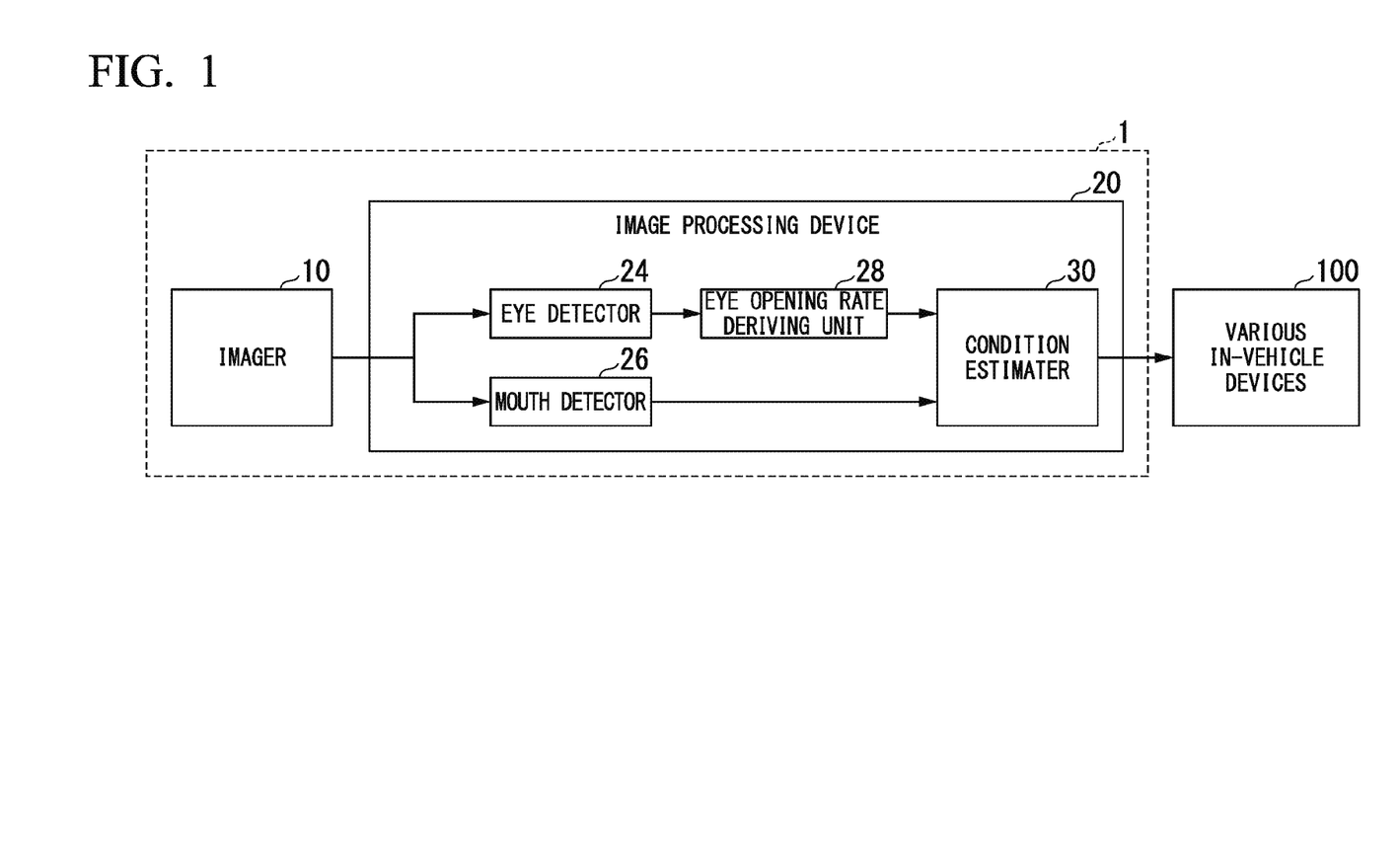
FIG. 1 is a diagram showing an example of a configuration and a usage environment of an occupant observation device.

FIG. 1 is a diagram showing an example of a configuration and a use environment of the occupant observation device 1. The occupant observation device 1 is equipped with, for example, an imager 10 and an image processing device 20. The image processing device 20 is equipped with, for example, an eye detector 24, a mouth detector 26, an eye opening rate deriving unit 28, and a condition estimator 30. The occupant observation device 1 estimates, for example, the condition of the occupant of the vehicle, and outputs the estimation result to various in-vehicle devices 100. The occupant may include at least a driver, and may include an occupant of a passenger seat. Various in-vehicle devices 100 are a driving supporting device, an automatic driving control device, an agent device, and other devices, and the occupant observation device 1 estimates and outputs the condition of the occupant according to the types and purpose of various in-vehicle devices 100. The condition of the occupant includes some or all of drowsiness, a direction of visual line, an emotion, and the like. In the following description, it is assumed that the occupant observation device 1 estimates the drowsiness of the occupant.

Figure 2:
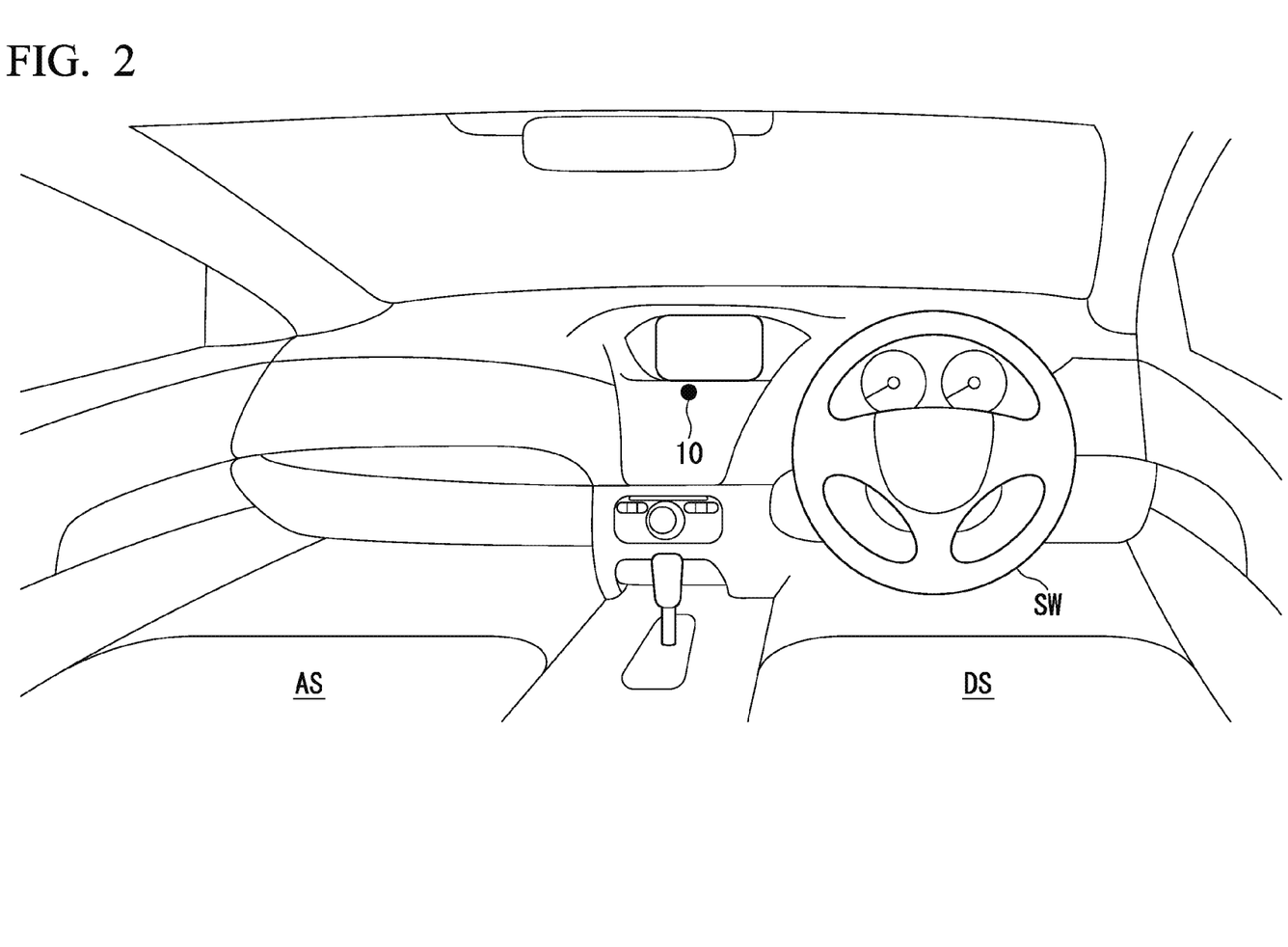
FIG. 2 is a diagram showing a position at which an imager is installed.

FIG. 2 is a diagram showing a position at which the imager 10 is installed. The imager 10 is installed, for example, in a central part of an instrument panel of the vehicle, and captures an image of at least the head of the occupant of the vehicle. The imager 10 is installed at a position offset in a horizontal direction from both a positions directly facing a driver's seat DS (an example of a seating position) provided with a steering wheel SW and a passenger seat AS (another example of the seating position). Therefore, the image captured by the imager 10 is an image obtained by capturing an image of the occupant's head obliquely in the horizontal direction. In other words, at least the occupant's head is not present on an optical axis of the imager 10.

The imager 10 includes, for example, one or both of an infrared camera that captures an image of infrared light and an RGB camera that captures an image of visible light as a color image. More preferably, the imager 10 includes at least an infrared camera, and may further include an RGB camera. In the following description, it is assumed that the imager 10 exclusively includes an infrared camera, and a case of including an RGB camera will be described later.

Returning to FIG. 1, each unit of the image processing device 20 will be described. The constituent elements of the image processing device 20 are realized, for example, by a hardware processor such as a central processing unit (CPU) that executes a program (software). Some or all of these constituent elements may be realized by hardware (a circuit unit; including circuitry) such as a large scale integration (LSI), an application specific integrated circuit (ASIC), a field-programmable gate array (FPGA), and a graphics processing unit (GPU), or may be realized by cooperation of software and hardware. The program may be stored in advance in a storage device such as a hard disk drive (HDD) or a flash memory (a storage device having a non-transitory storage medium) or may be stored in a detachable storage medium such as a DVD or a CD-ROM (a non-transitory storage medium), and may be installed by attaching the storage medium to a drive device.

With respect to the function of the eye detector 24, a method of detecting eyes after extracting an edge will be described as an example. The eye detector 24 extracts, for example, the edge in an image captured by the imager 10 (hereinafter, referred to as a captured image). The edge is a pixel (or a pixel group) in which a difference in pixel value between the pixel and its surrounding pixels is larger than a reference, that is, a characteristic pixel. The eye detector 24 extracts the edge using, for example, an edge extraction filter such as a SOBEL filter. The use of the SOBEL filter is merely an example, and the eye detector 24 may extract the edge on the basis of another filter or an algorithm.

The eye detector 24 detects at least a part of the eyes of the occupant in the captured image, for example, on the basis of the distribution of edges extracted in the captured image. At this time, the eye detector 24 sets the eye closer to the imager 10 among the eyes of the occupant as a detection target. If the occupant is seated in the driver's seat DS, the eye closer to the imager 10 is a left eye, and if the occupant is seated in the passenger seat AS, it is a right eye. The eye detector 24 may directly detect a part of the eyes (or a feature point to be described later), by inputting a captured image to a learned model generated by a machine learning method such as deep learning, without extracting the edge.

Figure 3:
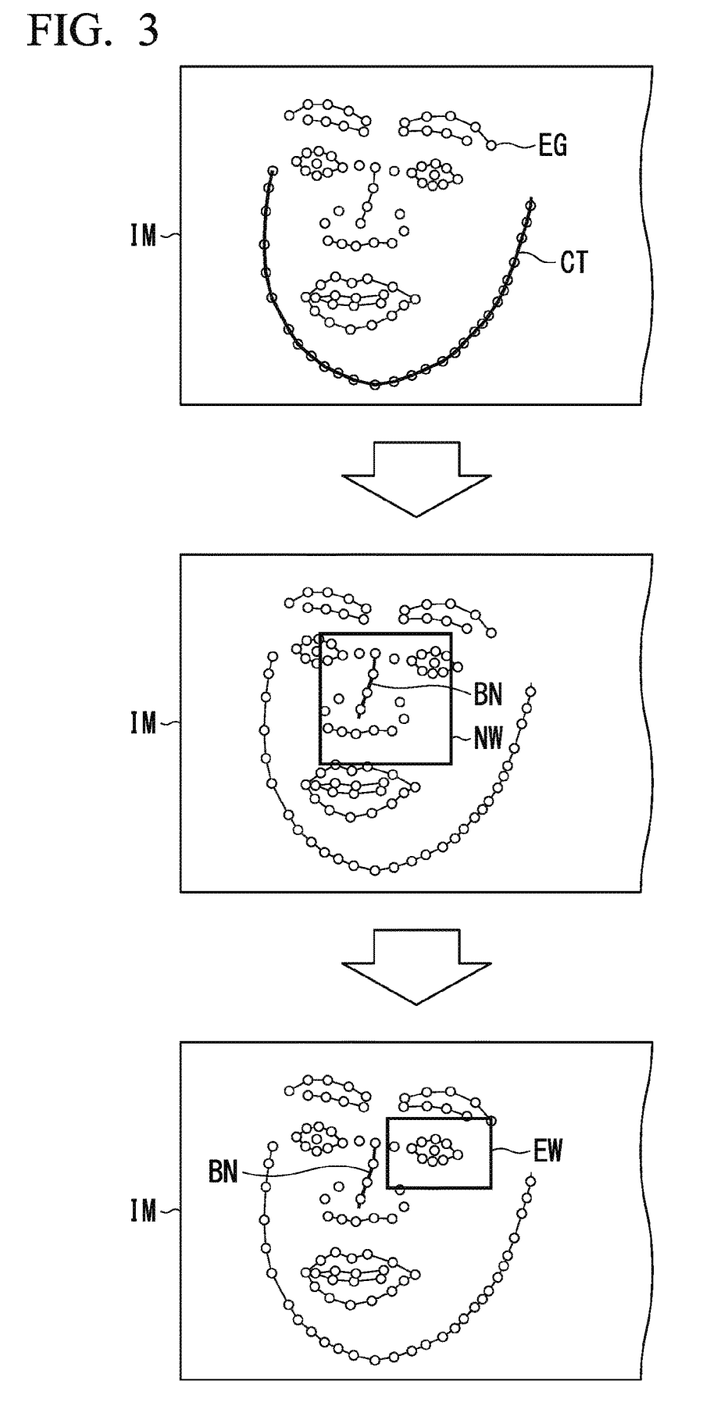
FIG. 3 is a diagram schematically showing the details of processes performed by an eye detector.

FIG. 3 is a diagram schematically showing the contents of the process performed by the eye detector 24. In the drawing, IM represents an image in which the edge EG is superimposed on the captured image. In this drawing, the occupant seated in the driver's seat DS is exclusively focused on. The eye detector 24 first extracts a contour CT, by fitting a model such as an ellipse or an oval to the edge EG, as shown in the upper diagram of FIG. 3. Next, as shown in the middle diagram of FIG. 3, the eye detector 24 sets a nose detection window NM on the basis of the contour CT, and detects a position of a nose bridge BN which is a part in which the edge is easily and clearly extracted in the nose detection window NM. Next, as shown in a lower diagram of FIG. 3, the eye detector 24 sets eye detection windows EWr and EWl of a predetermined size on the right side of the nose bridge BN in which the left eye of the occupant should exist, on the basis of the position of the nose bridge BN, and detects least a part of the eyes in the eye detection window EW. As a result, since the eye detection window EW is set at a position overlapping the left eye of the occupant seated in the driver's seat DS, the left eye is detected in the eye detection window EW. Although specific examples of the process of "detecting at least a part of the eyes" are variously defined, in the following description, it is assumed that "at least a part of the contour of the eyes is detected". When detecting the contour, the eye detector 24 detects the contour, for example, by fitting a curve model to the distribution of the edge EG.

The mouth detector 26 sets a mouth detection window MW (not shown) on the basis of the position of the nose bridge BN, for example, using a part of the processing course of the eye detector 24, and detects at least a part of the contour of the mouth in the mouth detection window MW. The contour of the mouth means, for example, a lower end line of an upper lip and an upper end line of a lower lip. Since the process of the mouth detector 26 is not the core contents of the present invention, a detailed description thereof will not be provided. Instead of the aforementioned case, the mouth detector 26 may directly detect a part of the contour of the mouth, by inputting a captured image to a learned model generated by a machine learning method such as deep learning.

Figure 4:
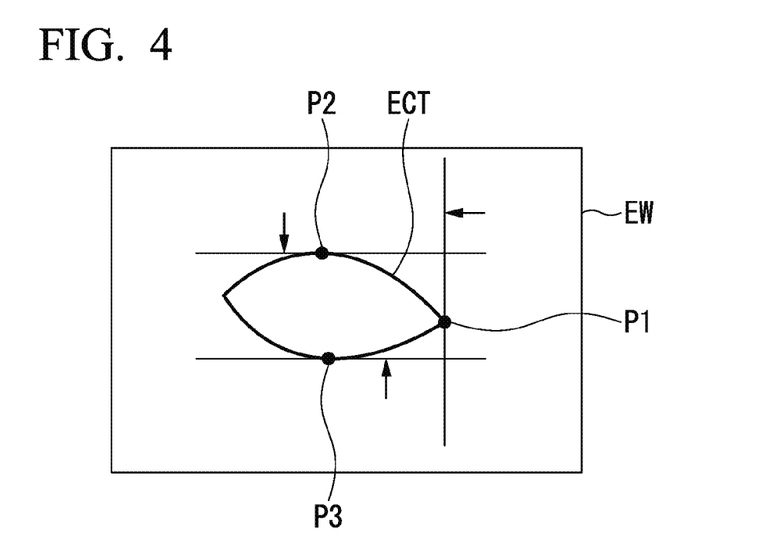
FIG. 4 is a diagram (part 1) for explaining the process of the eye opening rate deriving unit.

The eye opening rate deriving unit 28 derives the eye opening rate of the eyes of the occupant, on the basis of a positional relationship of a plurality of feature points in the contour of the eyes detected by the eye detector 24. The plurality of feature points includes, for example, a first feature point at an end portion of the contour of the eyes on the side closer to the imager 10 in a horizontal direction (corresponding to an outer canthus), a second feature point at the upper end portion, and a third feature point at the lower end portion. FIG. 4 is a diagram (part 1) for explaining the process of the eye opening rate deriving unit 28. In the drawing, P1 is a first feature point, P2 is a second feature point, and P3 is a third feature point. The eye opening rate deriving unit 28 virtually moves, for example, a vertical line from the right end of the eye detection window EW to the left inside in the eye detection window EW, and sets an intersection point at the time of first intersecting with the contour ECT of the eyes as the first feature point P1. The eye opening rate deriving unit 28 virtually moves, for example, a horizontal line downward from the upper end of the eye detection window EW inside the eye detection window EW, and sets the intersection point at the time of first intersecting with the contour ECT of the eyes as the second feature point P2. The eye opening rate deriving unit 28, for example, virtually moves the horizontal line upward from the lower end of the eye detection window EW inside the eye detection window EW, and sets the intersection point at the time of first intersecting with the contour ECT of the eyes as the third feature point P3.

Figure 5:
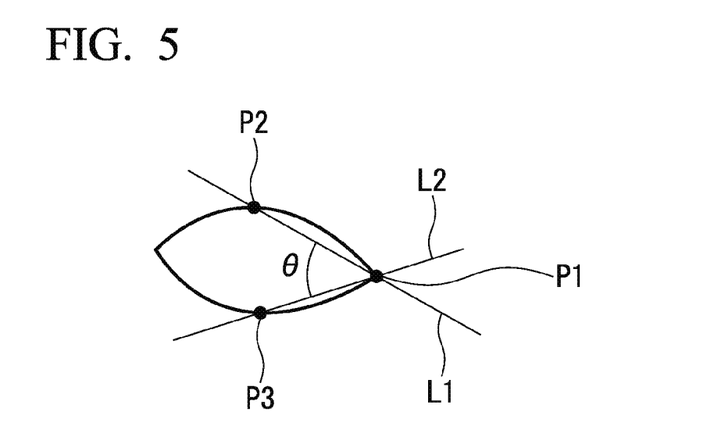
FIG. 5 is a diagram (part 2) for explaining the process of the eye opening rate deriving unit.

Further, the eye opening rate deriving unit 28 derives the eye opening rate of the occupant, on the basis of an angle formed between a first straight line connecting the first feature point P1 and the second feature point P2 and a second straight line connecting the first feature point P1 and the third feature point P3. FIG. 5 is a diagram (part 2) for explaining the process of the eye opening rate deriving unit 28. In the drawing, L1 is the first straight line, L2 is the second straight line, and θ is the angle between them. The eye opening rate deriving unit 28 defines, for example, a reference angle θini, which is obtained by averaging angles derived on the basis of captured images from about a first few minutes after the occupant gets into the vehicle, as the eye opening rate 100[%], and then derives the eye opening rate α by dividing the derived angle θ by the reference angle θini (see Formula (1)). However, the present invention is not limited thereto, and when a person authentication of the occupant is performed, the reference angle corresponding to 100[%] for each occupant may be stored in the memory, and the reference angle for each occupant may be read from the memory and used for calculation. The specified value may be set as the reference angle θini, or a specific value may be used initially and gradually adjusted to the average angle of the occupant.

$$\alpha = MIN\{\theta/\theta ini, 100[\%]\} \quad (1)$$

In the description so far, although the eye opening rate is derived on the basis of the angle θ on an image plane, for example, by preparing a three-dimensional model of the eyes and performing the above-described process after mapping two-dimensionally from the eye model rotated depending on a face orientation angle estimated from the relationship between the contour CT and the nose bridge BN, the estimation accuracy of the eye opening rate can be improved.

The condition estimator 30 digitizes (or encodes to indicate the stage) the drowsiness of occupant, for example, on the basis of the eye opening rate α derived by the eye opening rate deriving unit 28 and the movement of the contour of the mouth detected by the mouth detector 26, and outputs it to various in-vehicle devices 100. For example, the condition estimator 30 may output a numerical value indicating that the drowsiness of occupant increases as the eye opening rate α decreases, and output a numerical value indicating that the drowsiness of occupant increases as the number of times a "yawn" is inferred from the movement of the contour of the mouth increases. The condition estimator 30 digitizes the drowsiness of the occupant, for example, by calculating a weighted sum of a reciprocal of the eye opening rate c and the number of yawns in an observation period. For the method of detecting a yawn, for example, since the mouth greatly changes in the vertical direction when yawn, a method may be used in which a vertical length of the contour of the mouth detected by the mouth detector 26 is compared with a threshold value, and when a condition in which the vertical length is equal to or larger than the threshold value continues for a predetermined time or more, it is determined that a yawn has occurred.

As a result of setting the eye detection window EW at a position corresponding to the eye closer to the imager 10, when the degree of detection of eyes is lower than the reference, the eye detector 24 switches a detection target to an eye farther from the imager 10. Specifically, when observing the occupant seated in the driver's seat DS, the eye detector 24 switches the detection target to the right eye, by setting the eye detection window EW on the left side of the nose bridge BN. Conversely, when observing the occupant who seats in the passenger seat AS, the eye detector 24 switches the detection target to the left eye, by setting the eye detection window EW on the right side of the nose bridge BN. The expression "the degree of detection is lower than the reference" means, for example, that there are not a number of edges EG equal to or more than a reference number in the eye detection window EW, a fitting rate to the curve is not equal to or more than a reference value, and as a result of fitting to a curve, a curve does not turn into a closed curve or is divided into two or more curves, and an index value or a phenomenon calculated in the above-described process is not a desired result.

Figure 6:
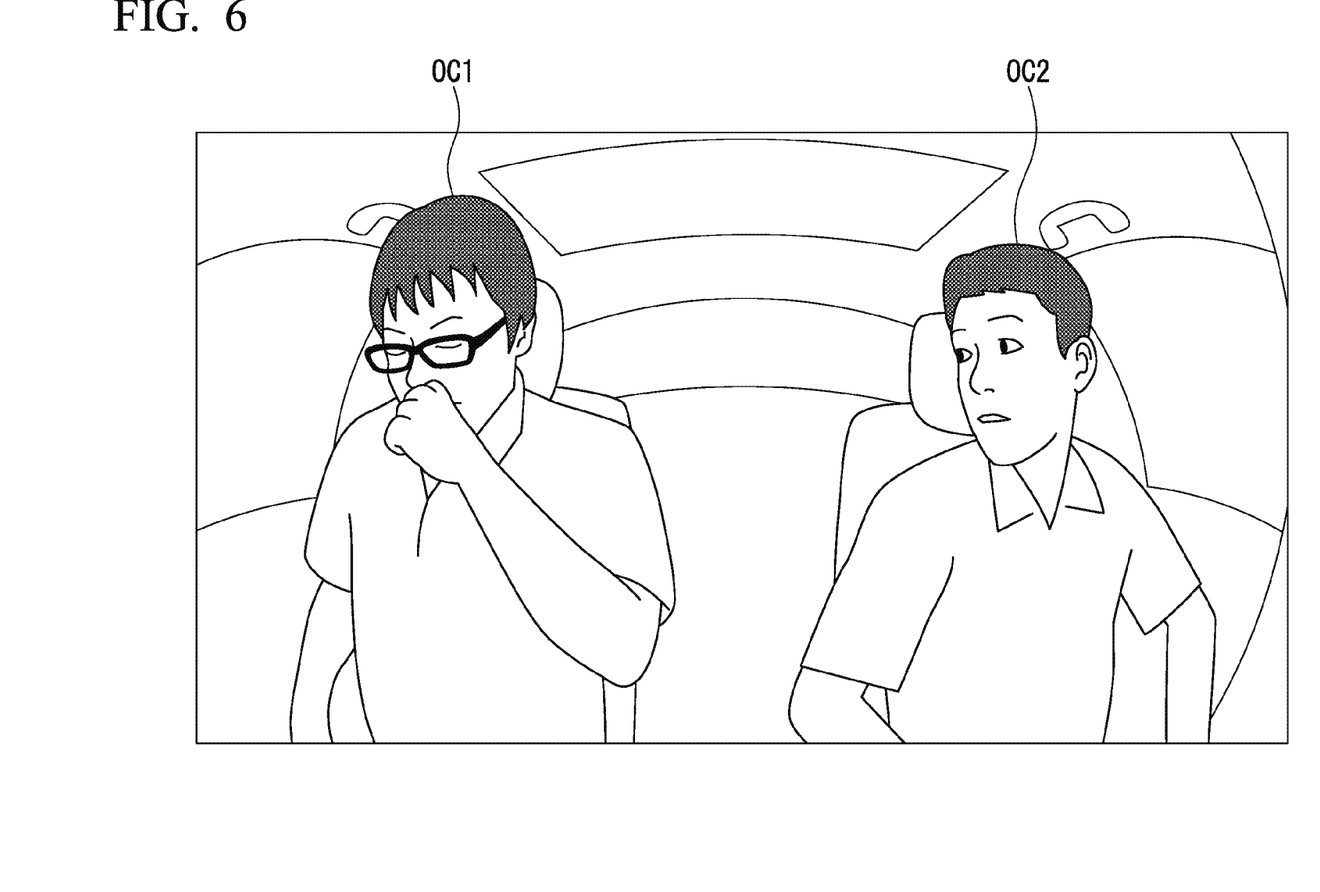
FIG. 6 is a diagram showing an example of a captured image when a degree of detection is lower than a reference.

FIG. 6 is a diagram showing an example of a captured image when the degree of detection is lower than the reference. In the drawing, since an occupant OC1 seated in the driver's seat DS has his eyes completely closed, the curve fitted from the edge EG in the eye detection window EW is only one curve. Since an occupant OC2 seated in the passenger seat AS is facing far toward the right side, the end portion (outer canthus) on the side close to the imager 10 is not reflected in the image. Thus, the curve fitted from the edge EG in the eye detection window EW does not become a closed curve. In both cases, the eye detector 24 determines that "the degree of detection is lower than the reference". The same also applies to a case in which a learned model is used. When a captured image as shown in FIG. 6 is input, the output value does not become a value with high reliability (high probability). Therefore, it is assumed that the eye detector 24 determines that "the degree of detection is lower than the reference".

Figure 7:
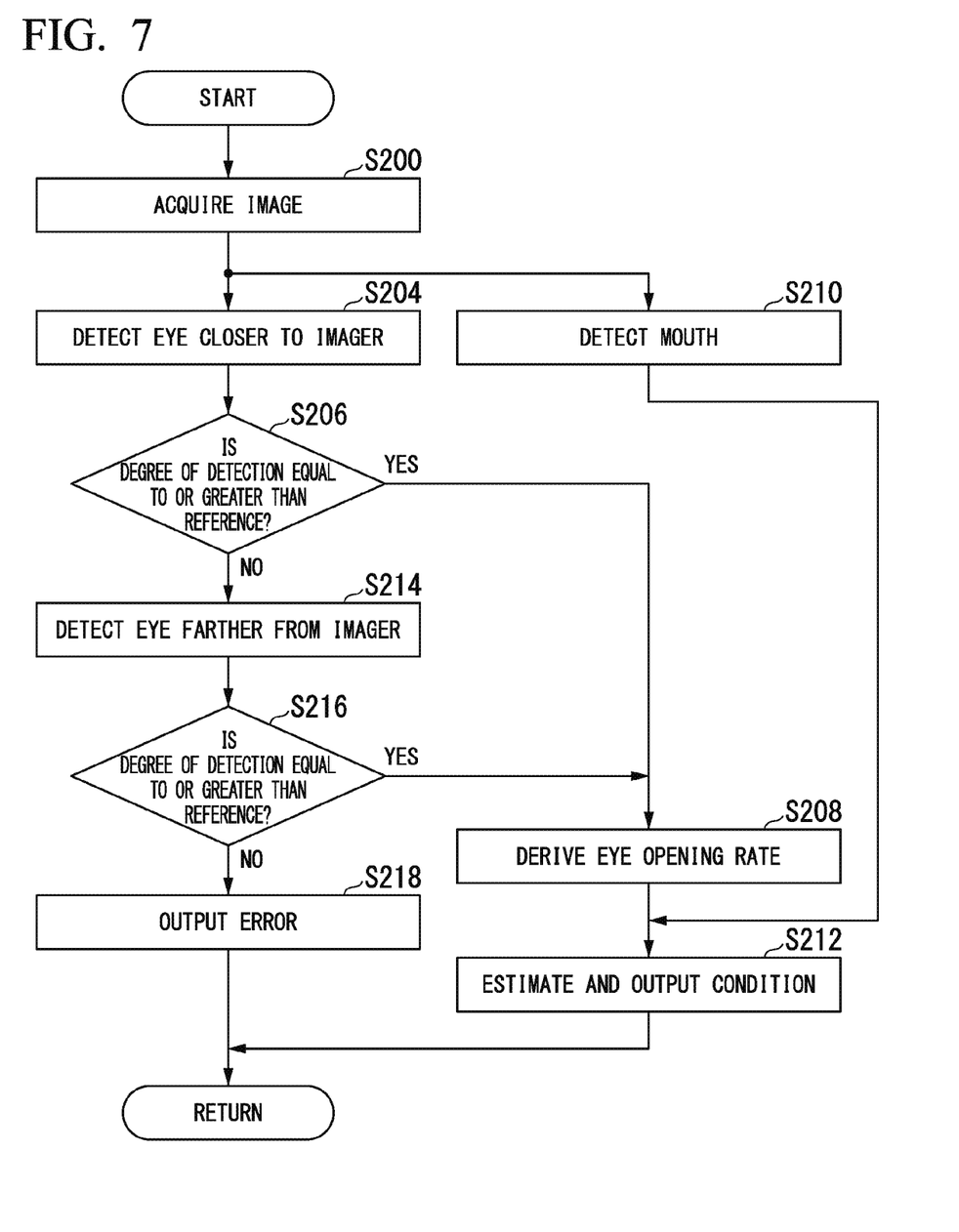
FIG. 7 is a flowchart showing an example of a flow of a process performed by the image processing device.

FIG. 7 is a flowchart showing an example of the flow of a process executed by the image processing device 20. First, the image processing device 20 acquires an image (captured image) captured by the imager 10 (step S200).

Next, the eye detector 24 detects an eye closer to the imager 10 (step S204), and determines whether the degree of detection of the closer eye is equal to or higher than a reference (step S206). When it is determined that the degree of detection is equal to or higher than the reference, the eye opening rate deriving unit 28 derives the eye opening rate (step S208).

In parallel with the process after step S204, the mouth detector 26 detects the occupant's mouth (step S210).

Further, the condition estimator 30 estimates the condition of the occupant on the basis of the eye opening rate and the movement of the mouth, and outputs the condition to various in-vehicle devices 100 (step S212).

If it is determined that the degree of detection is not equal to or higher than the reference in step S206, the eye detector 24 detects an eye farther from the imager 10 (step S214), and determines whether the degree of detection of the farther eye is equal to or higher than the reference (step S216). If it is determined that the degree of detection is equal to or higher than the reference, the process proceeds to step S208.

If it is determined that the degree of detection is not equal to or higher than the reference in step S216, the image processing device 20 outputs information indicating an error (step S218).

According to the aforementioned occupant observation device 1, the eye detector 24 can reduce the processing load and improve the detection accuracy, by first setting the eye closer to the imager 10 among the eyes of the occupant as the detection target. The reason for this is that, when both eyes are detection targets, the number of edges to be extracted increases, and the load of the edge extraction process, the fitting process, and the extraction process of the feature point increases, and on the other hand, when one eye is the detection target, the load of these processes is reduced. The reason for this is that, since the eye closer to the imager 10 is greatly reflected in the captured image as compared to the eye farther from the imager 10, the number of edges to be extracted increases, and the accuracy of extracting the contour of the eyes is expected to be higher than with the farther eye. The same also applies to a case in which a learned model is used. When both eyes are detection targets, the processing load increases due to an increase in the number of input nodes. By inputting the part of the eye that is greatly reflected in the captured image, improvement in accuracy is expected.

According to the occupant observation device 1, since the eye opening rate deriving unit 28 derives the eye opening rate of the eyes of the occupant on the basis of the positional relationship between a plurality of feature points in the contours detected by the eye detector 24, the processing load can be further reduced as compared with the case of analyzing the motion of the entire contour of the eyes. Since the plurality of feature points include an end portion, an upper end portion, and a lower end portion of the contours of the eyes on the side closer to the imager 10 in the horizontal direction, features that are likely to appear in the captured image can be set as processing targets, and the continuity of the process can be improved.

According to the occupant observation device 1, since the eye detector 24 switches the detection target to the eye farther from the imager 10 among the eyes of the occupant, on the basis of the degree of detection of the eye closer to the imager 10 among the eyes of the occupant, the eyes of the occupant can be continuously detected and continuity of the process can be improved, when the occupant's posture moves significantly, or even when the eye closer to the imager 10 whites out due to the lighting conditions.

In the above-described embodiment, the imager 10 exclusively includes an infrared camera. However, when further including an RGB camera, the eye detection and the mouth detection may be performed after calculating a logical sum or a logical product of the edge obtained from the captured image of the infrared camera and the edge obtained from the captured image of the RGB camera. The processes such as the eye detection, the mouth detection, and the eye opening rate derivation are performed in parallel for both and may be integrated in the process of the condition estimation, and the processes for two or more images may be integrated by an arbitrary method. The camera to be specified may be switched depending on the time, such as using an infrared camera at night and using an RGB camera (or both an infrared camera and an RGB camera) during the day. When a learned model is used, a combination of a captured image of the infrared camera and a captured image of the RGB camera may be input to the learned model.

By modeling the transition of the opening degree when a yawn occurs, using the detection result of the mouth detector 26, and by restricting to motion of the mouth that occurs only during driving as distinguished from during conversations and the like, it is possible to improve the accuracy of recognition of conversations and songs, use speech information with improved accuracy, and to improve the accuracy of recognition of eating, drinking, gestures, the heartbeat, and respiration (determination of motion of the lungs), using object recognition.

As described above, although the embodiments for realizing the present invention have been described using the embodiments, the present invention is not limited to these embodiments at all, and various modifications and substitutions may be made without departing from the gist of the present invention.

Modified Example

Figure 8:
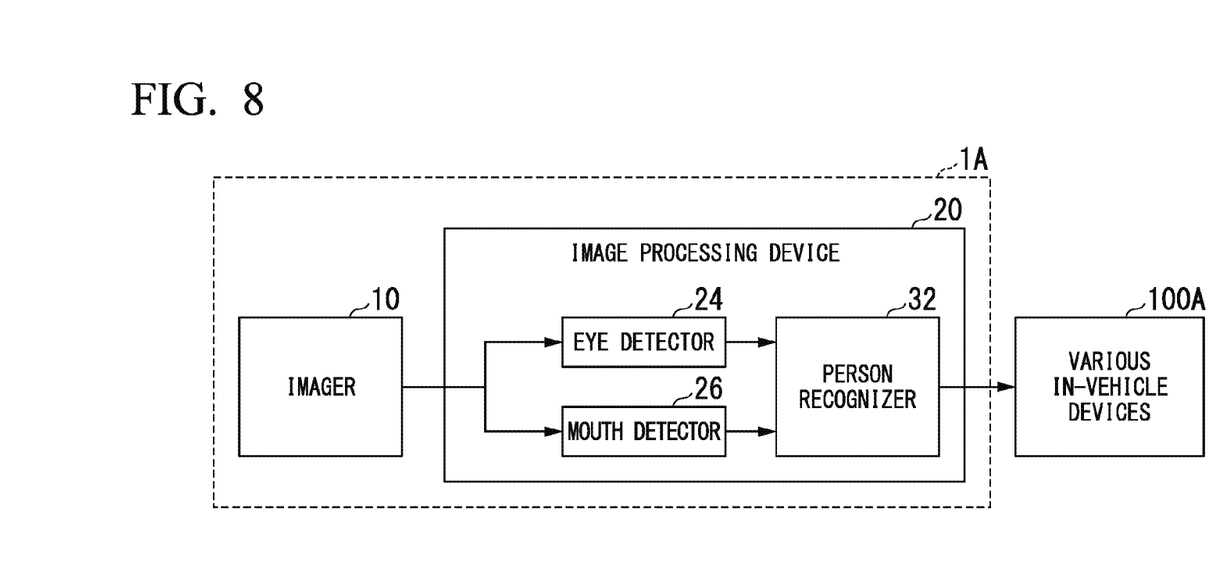
FIG. 8 is a diagram showing an example of a configuration and a use environment of an occupant observation device according to a modified example.

Hereinafter, a modified example of the embodiment will be described. The occupant observation device of the modified example is a device used exclusively for personal authentication. FIG. 8 is a diagram showing an example of a configuration and a use environment of an occupant observation device 1A according to a modified example. The occupant observation device 1A is equipped with a person recognizer 32, instead of the eye opening rate deriving unit 28 and the condition estimator 30. Constituent elements denoted by reference numerals the same as those in the above-described embodiment have the same functions as those described above, and description thereof will not be provided.

The person recognizer 32 estimates whether the occupant is a pre-registered occupant (performs person recognition) on the basis of, for example, the contour of the eye detected by the eye detector 24 and, for example, the contour of the mouth detected by the mouth detector 26. The person recognizer 32 compares, for example, geometric data and bitmap data representing the shape and size of the contour stored in the memory in advance or data representing the characteristics of the contour with data of the contour input to perform person recognition. The person recognizer 32 may perform person recognition by inputting data of the contour to a learned model obtained by machine learning.

The processing result of the person recognizer 32 is output to various in-vehicle devices 100A. The various in-vehicle devices 100A are arbitrary devices that require personal authentication, and may be the same as or different from the aforementioned various in-vehicle devices 100.

According to the aforementioned modified example, the processing load can be reduced and the detection accuracy can be improved as in the embodiment.

What is claimed is:
1. An occupant observation device comprising:
   an imager configured to capture an image of a head of an occupant of a vehicle; and
   an eye detector configured to detect at least a part of eyes of the occupant in the image captured by the imager,
   wherein the eye detector sets an eye closer to the imager among the eyes of the occupant as a detection target.
2. The occupant observation device according to claim 1, wherein the imager is attached at a position which is offset in a horizontal direction from a position directly facing a seating position of the occupant in the vehicle.

3. The occupant observation device according to claim 1,
wherein the eye detector detects at least a part of contours of the eyes of the occupant, and the occupant observation device further comprises an eye opening rate deriving unit configured to derive an eye opening rate of the eyes of the occupant, based on a positional relationship of a plurality of feature points in the contours detected by the eye detector.

4. The occupant observation device according to claim 3, wherein the plurality of feature points include an end portion, an upper end portion, and a lower end portion of the contours on a side closer to the imager in the horizontal direction.

5. The occupant observation device according to claim 1, wherein the eye detector switches the detection target to an eye farther from the imager among the eyes of the occupant, based on a degree of detection of the eye closer to the imager among the eyes of the occupant.

\* \* \* \* \*